United States Patent
Röttger et al.

[19]

[11] Patent Number: 5,919,370
[45] Date of Patent: Jul. 6, 1999

[54] INTEGRAL, MULTI-ASYMMETRIC, SEMI-PERMEABLE MEMBRANE

[75] Inventors: Henning Röttger, Worth; Friedbert Wechs, Wörth, both of Germany

[73] Assignee: Akzo Nobel NV, Arnhem, Netherlands

[21] Appl. No.: 08/952,025

[22] PCT Filed: May 2, 1996

[86] PCT No.: PCT/EP96/01814

§ 371 Date: Nov. 14, 1997

§ 102(e) Date: Nov. 14, 1997

[87] PCT Pub. No.: WO96/37282

PCT Pub. Date: Nov. 28, 1996

[30] Foreign Application Priority Data

May 24, 1995 [DE] Germany .................... 195 18 624

[51] Int. Cl.[6] .................... B01D 61/00; B01D 69/00
[52] U.S. Cl. .................... 210/646; 210/490; 210/500.21; 210/500.23; 210/500.41; 210/650; 264/41; 264/176.1; 264/178 R; 264/209.1
[58] Field of Search .................... 210/646, 650, 210/652, 653, 500.21, 500.23, 500.41, 490, 496; 264/41, 45.1, 45.5, 48, 176.1, 178 R, 209.1; 604/890.1

[56] References Cited

U.S. PATENT DOCUMENTS

| | | | |
|---|---|---|---|
| 4,976,859 | 12/1990 | Wechs | 210/500.23 |
| 5,236,588 | 8/1993 | Zhang et al. | 210/500.35 |
| 5,554,292 | 9/1996 | Maeda et al. | 210/640 |

FOREIGN PATENT DOCUMENTS

| | | |
|---|---|---|
| A 0 247 597 | 12/1987 | European Pat. Off. . |
| A 0 305 787 | 3/1989 | European Pat. Off. . |
| A 0 341 473 | 11/1989 | European Pat. Off. . |
| A 0 357 021 | 3/1990 | European Pat. Off. . |
| B 0 361 085 | 3/1993 | European Pat. Off. . |
| A 2 541 586 | 8/1984 | France . |
| 33 27 638 A1 | 2/1985 | Germany . |
| WO 93/04223 | 3/1993 | WIPO . |

*Primary Examiner*—John Kim
*Attorney, Agent, or Firm*—Oliff & Berridge, PLC

[57] ABSTRACT

Membranes suitable for use in haemodialysis include a separating layer A with a cut-off between 500 and 5,000,000, a support layer B and a layer C which partly determines the hydraulic permeability. The cut-off and hydraulic permeability can be set independently of one another. The membranes are integral, multi-asymmetric, semi-permeable membranes made from ε-caprolactam-soluble polymers. The membranes may be in the form of flat, tubular or hollow fiber membranes.

19 Claims, 3 Drawing Sheets

Distribution of pores in the membrane (diagrammatic)

A: Separating layer with open-pored surface
B: Support layer
C: Condensed layer
D: Open-pored surface

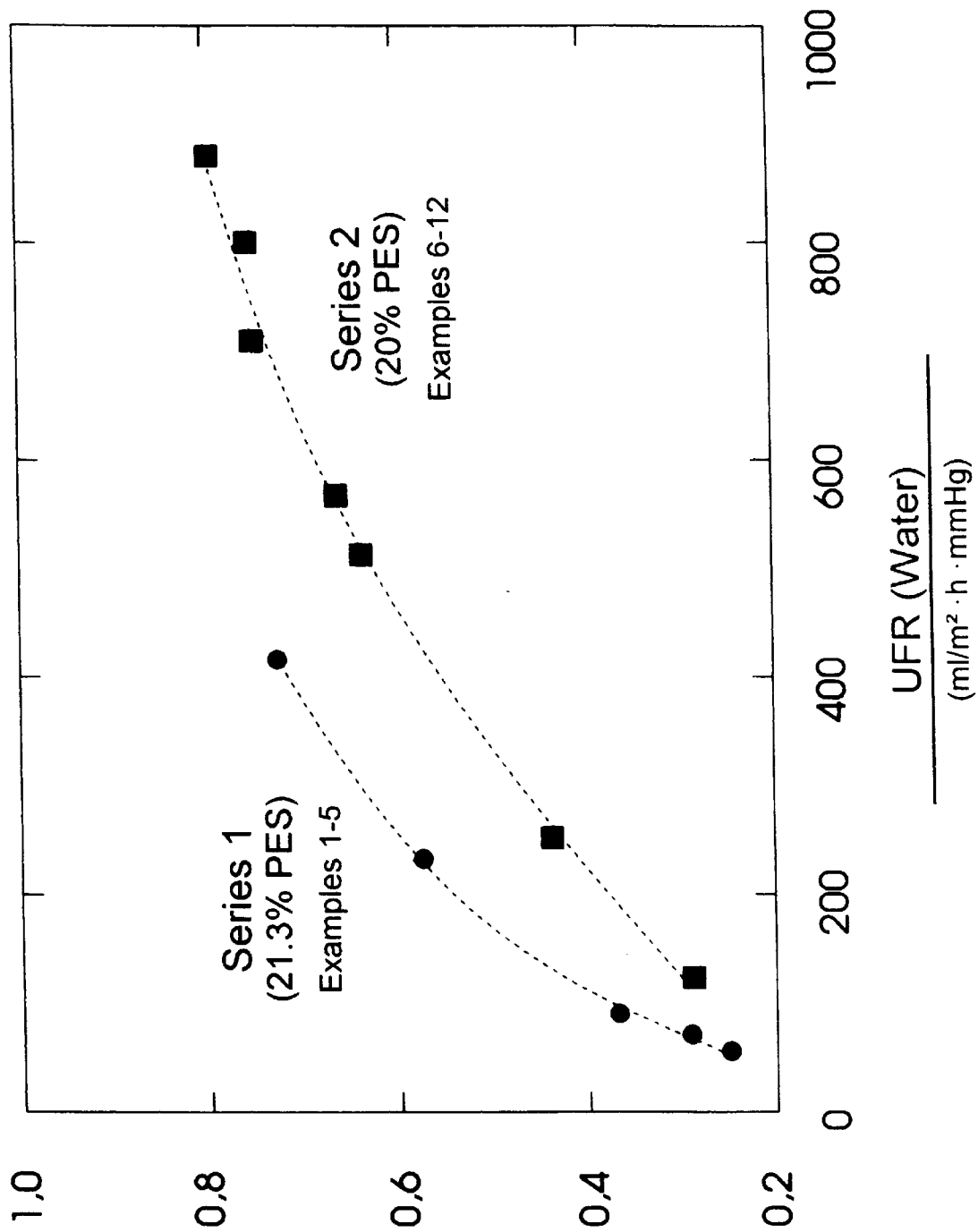

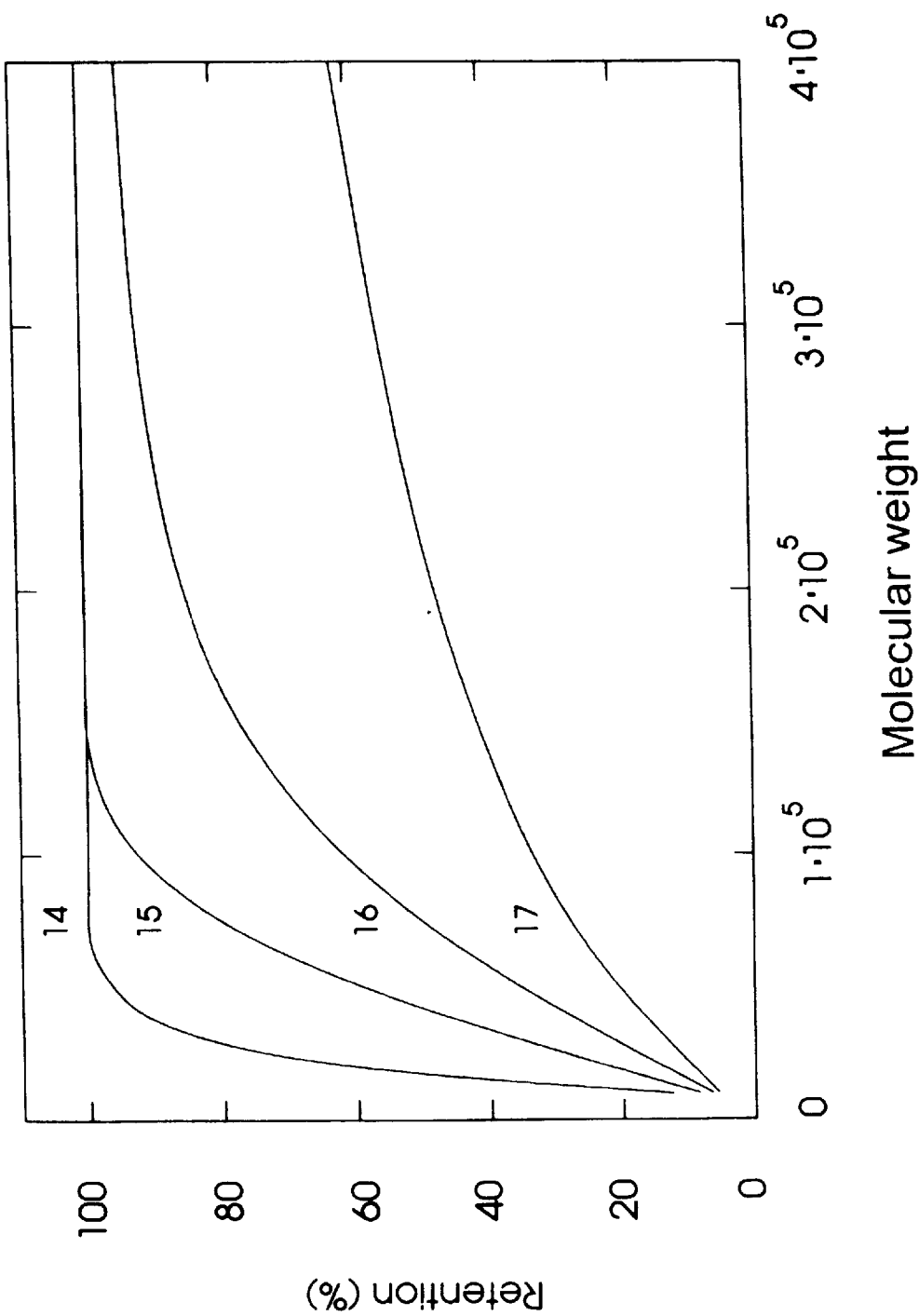

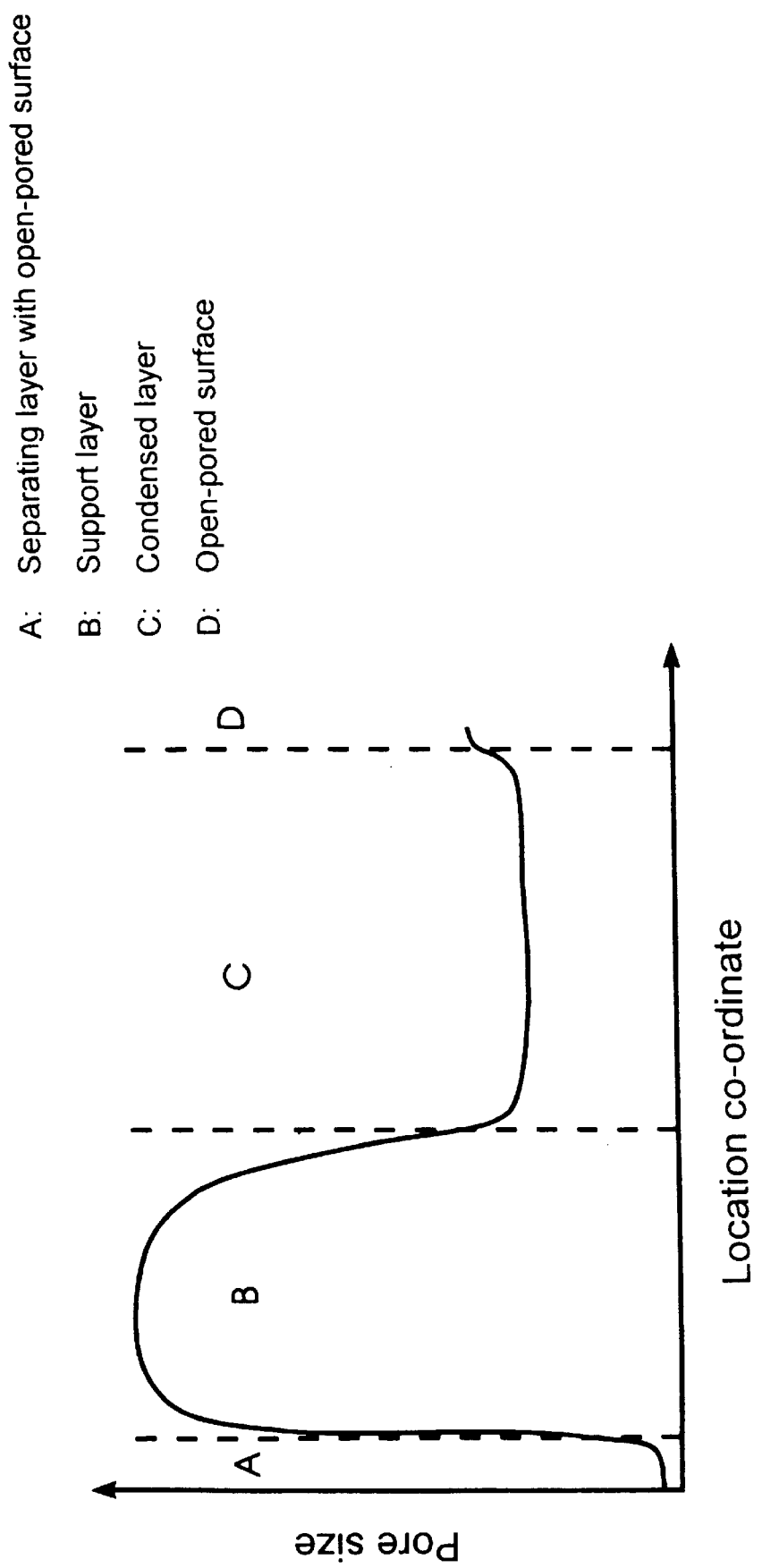
Fig. 3  Distribution of pores in the membrane (diagrammatic)
A: Separating layer with open-pored surface
B: Support layer
C: Condensed layer
D: Open-pored surface

INTEGRAL, MULTI-ASYMMETRIC, SEMI-PERMEABLE MEMBRANE

This is a §371 (U.S. national stage application) of International Application PCT/EP96/01814, filed May 2, 1996.

BACKGROUND OF THE INVENTION

The invention relates to an integral, asymmetric, synthetic separating membrane for the nanofiltration range and the lower ultrafiltration range based on polymers, which are soluble in ε-caprolactam, a process for production of the same, and the application of these membranes.

Membranes produced from synthetic polymers have been known for a long time. The use of ε-caprolactam as a solvent in the production of membranes made of synthetic polymers is already a recognised method.

DE-PS 3 327 638 describes a method for the production of porous shaped articles, in which a suitable hollow fiber is manufactured from polyamide-6, ε-caprolactam and polyethylene glycol. Shaping takes place at a nozzle temperature of 210° C. The spinning solution is homogenous and has a low viscosity and must therefore be extruded into a U-shaped cooling tube, in which the mechanical load exerted on the polymer mixture is kept low until the point where solidification begins.

According to the described method, precipitation of the polymer takes place by a thermally induced process. Coagulation diffusively induced by a precipitation agent does not effectively take place. The membranes described in DE-PS 3 327 638 are suitable for microfiltration, and generally have an isotropic structure.

An indication is also given that it is possible to obtain an anisotropic system of pores, but except for the comment that there is a gradient inside the shaped article in the direction of the surface, no further information is provided about the asymmetry of the membranes.

EP-B1-0 361 085 describes integral, asymmetric polyether sulfone membranes, methods for their production and their use in ultrafiltration and microfiltration. The polyether sulfone membranes mentioned here have maximum pore diameters within a range of 0.02 to 2 μm, so that these membranes are mainly suitable for microfiltration and for the upper, large-pore ultrafiltration range. Membranes which are suitable for nanofiltration, haemodialysis, haemodiafiltration and haemofiltration and the lower small-pore range of ultrafiltration are not described in this patent specification.

EP-B1-0 357 021 describes a method for the production of membranes from certain polymers, in which ε-caprolactam is used as the main solvent component and in which the shaping of membranes and other articles is conducted on the principle of phase separation. The membranes described in this patent specification are also used in the microfiltration and ultrafiltration ranges, and are also suitable for controlled drug release.

It is well-known that membranes which are intended for use in certain separating purposes must also fulfill certain requirements. Their function is to allow exchange processes, whereby this may, for example, be to remove solid particles from a liquid or to separate dissolved particles, depending on the allocated task.

It has been found useful to divide the separating processes into certain categories, whereby the range of reverse osmosis is referred to as hyperfiltration. As the pore size increases, the next range up is nanofiltration, followed by ultrafiltration, microfiltration and particle filtration.

This division into five different filtration ranges has proven successful in practice, but it is important to note that the ranges may overlap at their upper and lower ends.

In the particle filtration range it is relatively easy to place the pore size in relation to the permeability and retention capability for particles of a certain size, since in these ranges both the particle size and the pore size can be determined relatively easily, e.g., they can be seen with the naked eye, at least in the upper range of particle filtration, and with optical microscopes in the medium and lower ranges. In these filtration ranges, the particles to be separated are solid particles which essentially maintain their geometric dimensions during filtration. This also applies essentially for the range of microfiltration, in which very fine particles such as color pigments, bacteria, soot particles in tobacco steam, etc. can be filtered out. Here, it is still possible to place the pore size and particle size in relation to each other.

For ultrafiltration membranes, which have narrower pores, the cut-off of the membrane is determined. In this process, precisely defined solutions of molecules with a known molecular weight, size and shape are used under defined filtration conditions. Measurements using aqueous polydisperse dextran solutions are usually undertaken, which make it possible to determine the cut-off of the membrane for a wide range of molecular weights. This method is described, for example, in Biotechnology, Vol. 9, pages 941–946, year of issue 1991 (G. Tkacik and S. Michaels).

It is common practice to determine the sieve coefficient of cytochrome C, albumin and other proteins of a defined molecular weight, especially for medical dialysis membranes (artificial kidney). The sieving coefficient is defined as $$S_k = \frac{C_{Permeate}}{C_{Parent\ solution}}$$

whereby $C_{Permeate}$ is the concentration of the substance to be determined in the filtrate (the permeate) and $C_{Parent\ solution}$ is the concentration of the substance in the original solution.

In the context of the present invention, the upper range of ultrafiltration is the range in which the membrane pores which determine the cut-off have a diameter of 0.02 μm and above. The lower range is the ultrafiltration range in which the membrane pores which determine the cut-off range have a diameter of less than 0.02 μm.

SUMMARY OF THE INVENTION

Although numerous membranes have already been described for very diverse separating purposes, and methods are known in which ε-caprolactam is used as a solvent for production of the membranes, there is still a need for improved membranes, in particular membranes in which not only the cut-off but also the hydraulic permeability can be set largely independently of one other within the widest possible ranges, and which are suitable for application in nanofiltration and the lower range of ultrafiltration.

The object of the invention is therefore to provide membranes with a cut-off and hydraulic permeability that can be set exactly, but for which, on the other hand, the hydraulic permeability can also be set precisely, irrespective of the cut-off, so that it is possible to produce membranes with a defined cut-off which can have a low, medium or even high hydraulic permeability, as required.

On the other hand, it should also be possible to produce membranes with a given hydraulic permeability, for which it is also possible to set the cut-off within certain ranges, as required.

On the other hand, it should be possible to produce membranes for special purposes by using certain polymers, which membranes also have specific qualities, such as: they can be steam sterilized, are biocompatible or compatible with blood, e.g., have a well-balanced ratio of hydrophilic and hydrophobic groups on the surface of the membrane, or have a suitably marked charge, are chemically stable, oxidation resistant, UV-resistant, reusable even after drying, can be stored dry without detriment to their performance, have good adsorption characteristics and good mechanical properties.

The solution to these problems is an integral, multi-asymmetric, semi-permeable membrane made from ε-caprolactam-soluble polymers in the form of flat membranes, tubular membranes or hollow fiber membranes, comprising
 a) a separating layer A which is open-pored on the surface, with a defined cut-off within a range of between 500 and 5 million Daltons, whereby the separating layer A accounts for a maximum of 20% of the entire thickness of the membrane wall and has permeable pores,
 b) a large-pored, sponge-like, support layer B which is adjacent to the separating layer A, with cell-like pores but without finger pores, which has a pore gradient starting from the border with the separating layer, and has a hydraulic resistance to separating layer A and layer C that is negligibly low,
 c) a layer C which is adjacent to layer B, with a pore size which is larger than that of separating layer A but smaller than that of support layer B, and which in combination with the separating layer A determines the hydraulic permeability of the membrane, without affecting the cut-off, and which is open-pored on its other surface, whereby these open pores are larger than the open pores on the surface of separating layer A.

BRIEF DESCRIPTION OF THE DRAWINGS

FIG. 1 illustrates in graph form the results for the membranes of Examples 1–12.

FIG. 2 illustrates the retention capability for dextran molecules by the membranes of Examples 14–17.

FIG. 3 illustrates the pore distribution in a membrane of the invention.

DETAILED DESCRIPTION OF PREFERRED EMBODIMENTS

The separating layer should preferably account for a maximum of between 5 and 10%, or more preferably a maximum of between 1 and 5%, of the entire thickness of the membrane wall.

In a particularly advantageous embodiment of the present invention, the defined cut-off lies within a range of 500 to 400,000 Daltons, and especially within a range of between 500 and 60,000 Daltons.

It is advantageous if at least 50% of the pores in the support layer B have a diameter of between 0.1 and 10 μm, and at least 50% of the pores in layer C have a pore diameter of between 0.05 and 2 μm, whereby the pore size in layer C is smaller than that in the porous layer B.

It is advantageous if the support layer B accounts for between 10 and 60% and layer C accounts for between 30 and 80% of the entire thickness of the membrane.

In a particularly advantageous embodiment of the present invention, the membrane consists of at least 80 weight percent polyether sulfone.

The object of the invention is also a process for manufacturing membranes of the type described above, by using a polymer which is soluble in ε-caprolactam, preparing a highly viscous 17 to 27 weight percent solution of the polymer in a mixture of ε-caprolactam and one or more co-solvents and, if necessary, nonsolvents and further additives whereby the solution has a viscosity of at least 20 Pa.s when measured at 40° C., shaping this solution into a flat, tubular or hollow-fiber membrane using standard tools, whereby during the shaping of the polymer solution a viscosity profile throughout the thickness of the forming membrane is set by applying different temperatures on each surface of the shaped polymer solution, precipitating the polymer by means of diffusively induced coagulation, if necessary using an in-process conditioned air space containing a non-solvent of the polymer in gas or vapor form, during which process the separating layer A is formed by faster coagulation on the side with the lower temperature (and therefore higher viscosity) than on the side on which layer C is formed.

Preferably, a solution with a temperature of between 20 and 90° C. is used for the shaping process.

Preferably, a polymer solution is used for the shaping process which has a temperature of between 40 and 90° C. and a viscosity of between 5 and 150 Pa.s at the shaping temperature.

A solution of the polymer with a viscosity of between 40 and 200 Pa.s when measured at 40° C. is preferred, and especially one with a viscosity of between 50 and 150 Pa.s.

In a further advantageous embodiment of the process of the invention, a hollow fiber membrane is produced in the following manner: the solution is shaped into a hollow fiber membrane and an inner filling with a viscosity of between 0.03 and 0.5 Pa.s when measured at 25° C. is used to induce coagulation inside the hollow fiber membrane, the hollow fiber is guided through an air gap which is conditioned with water vapor, and the hollow fiber is then guided through a precipitation bath, which is preferably a temperature-controlled water bath, for completion of the coagulation process and fixing of the structure.

Further objects of the invention are the use of the membrane for separating processes in the nanofiltration range and in the lower ultrafiltration range, in particular for haemodialysis, haemodiafiltration and haemofiltration. The membranes can also be used for encapsulating active agents. The encapsulated active agents can be released into the surrounding environment on the principle of long-term release; it is also possible for the encapsulated active agents to interact with the surrounding environment without the active agents leaving the capsules. These encapsulated active agents can be used both inside and outside the body in the field of medicine.

Polymers are used for manufacturing the membranes of the present invention which are soluble in ε-caprolactam or mixtures of ε-caprolactam and one or more co-solvents, and which have film or membrane-forming characteristics. These polymers include, among others, polyvinylidene fluoride, polyether sulfones, polysulfones, ethylene vinyl alcoholpolymers, polyether imides, cellulose triacetate, polyurethanes, polymethyl methacrylate, polyamide-6, polycarbonates, polyacrylonitrile, polyether ester, polyether ketones and similar substances.

These polymers can be used alone, mixed or as co-polymers. Biocompatible polymers are preferred, in particular polymers which are compatible with blood. These polymers may be inherently biocompatible or compatible with blood, but they can also be made biocompatible with the addition of additives or through modification. This modification may be either chemical or physical, e.g., by means of plasma treatment.

The co-solvents used can be solvents which can as such dissolve the polymers used, or they may be solvents of a kind which only dissolve the polymer when combined with ε-caprolactam. This group also includes solvents which only dissolve the membrane-forming polymer poorly or only at an increased temperature. These solvents are known as latent solvents, and some examples are butyrolactone, propylene carbonate and polyalkylene glycols. The solvents which are able to dissolve some of the polymers named above when used alone include, among others, dimethyl sulfoxide, dimethylformamide, N-methylpyrrolidone, dimethyl acetamide etc. Latent solvents are, however, preferred for use as co-solvents.

In the context of the present invention, nonsolvents are understood as compounds which are not able to dissolve the polymer alone and/or which lower the dissolving potential of the mixture ε-caprolactam/co-solvent, i.e., they decrease the solubility of the polymer in the mixture. Depending on the type of polymer, some of the substances which can function as nonsolvents include: water, glycerine, polyethylene glycols, alcohols such as ethanol, isopropyl alcohol, and many more.

Possible additives are compounds such as polyvinylpyrrolidone, polyethylene glycol, polyacrylates, polyvinyl alcohol, etc. Filler materials such as silicic acid or pigments can also be added.

Among other characteristics, these additives may have thickening effects, can also function as pore formers or nucleation agents, or can improve the wettability of the membrane, in particular with water. The additives can, if necessary, additionally be chemically or physically modified in the membrane. It is, for example, possible to make polyvinylpyrrolidone insoluble in water when it has already been integrated in the membrane.

It is, however, also possible to use additives which affect the stability of the membrane, its color, and the absorption or adsorption capacity. Additives can also be used which determine the charge of the membranes, for example, they may give the membrane anionic or cationic character. These include, for example, compounds such as sulphonated polyether sulfones, e.g., as they are described in the European patent application EP-A-0 341 473.

The addition of one or more co-solvents is necessary because ε-caprolactam itself is a substance which melts at a temperature of about 70° C., so that solutions of polymers would have to be produced at this or higher temperatures. When co-solvents are added, the dissolving temperature or the temperature of the polymer solutions can be considerably lower, for example, at 40° C. or even at room temperature.

It is important in the process of the present invention for the solution which is shaped into a membrane using shaping tools to have a viscosity of at least 20 Pa.s when measured at 40° C.. This viscosity can, on the one hand, be adjusted by means of the concentration and molecular weight of the polymers used, and on the other, the addition of an additive also serves to adjust the viscosity. The viscosity is also dependent on the proportion of ε-caprolactam used in the mixture of ε-caprolactam and co-solvent which is used to produce the polymer solution, and also on the type and concentration of the co-solvents and nonsolvents. In the context of the present invention, a viscosity of at least 20 Pa.s when measured at 40° C. is understood as the viscosity of the entire solution. This also applies for corresponding preferred values.

The polymer solution can be produced by first simply mixing all the components together, whereby it is important to ensure that they are thoroughly mixed. Preferably, the dissolution process should then take place under the application of heat, whereby temperatures of about 30 to 120° C. are advantageous. The suitable temperature depends particularly on the polymer used and the concentration ratios, and can be determined easily with simple tests.

The tools used for shaping the solution can be standard shaping tools, such as slit dies, casting boxes with a doctor blade for feeding onto a roller or carrier web, ring-shaped hollow-fiber nozzles with a device for feeding liquid into the center to form the lumen, and similar equipment.

The viscosity profile, which is set with the two different temperatures on each surface of the shaped polymer solution, is dependent on the one hand on the temperature of the solution which is to be formed. It is, therefore, possible to set the course of the viscosity profile with the temperature of the solution (shaping or spinning temperature) and with the temperature differences between this temperature and the temperatures on the two surfaces of the shaped polymer solution.

For flat membranes, the temperature of the solution can be set in a first step, then, for example when working with a carrier roller, the temperature on one surface can be adjusted by the temperature of the support and the temperature on the other surface can, for example, be affected by the temperature of the casting lip of the casting box. Furthermore, the temperature of the conditioned air space, the use of which is favored in methods of this kind for the production of flat membranes, can also affect the form of the viscosity profile.

Coagulation is therefore delayed on the side on which layer C is formed, and takes place during the period of time calculated from the time when the solution leaves the shaping tool through to completion of the coagulation process in the precipitation bath. Coagulation of layer A, on the other hand, does not begin until the pre-shaped article enters the precipitation bath off the roller.

In the production of hollow-fiber membranes, the temperature of the spinning solution is also important, and the temperatures on the surfaces of the shaped polymer solutions are controlled by the temperature of the nozzle, that is, most particularly the part of the nozzle which forms the outer surface of the hollow fiber membrane, and by the temperature of the inner filling.

The inner filling brings about the formation of the separating layer A; in other words, it initiates a faster coagulation process. This is due in particular to the proportion and type of nonsolvent used and the viscosity of the inner filling. Here, the proportion of nonsolvent is high enough to cause coagulation to take place more quickly on the inner surface than in the air space. On the outer side of the membrane which is being formed, nonsolvents are first absorbed in a certain amount by the outer surface of the membrane from the conditioned atmosphere in the air space, which causes delayed pre-coagulation. The process of diffusively induced coagulation is then completed in a precipitation bath, which is ideally temperature-controlled and is an aqueous bath.

As an alternative to the use of a coagulation-delaying, conditioned air space, it is also possible to extrude the membrane into a precipitation bath, which has a slighter precipitation effect than the inner filling. It can be advantageous here to include a small air gap between the surface of the precipitation bath and the nozzle outlet surface. It is, however, also possible to extrude the membrane directly into the precipitation bath.

If the separating layer is to be on the outside of the membrane, the process parameters must be reversed accordingly.

In the context of the present invention, polyether sulfones are understood as polymers which have the following repeated structural element.

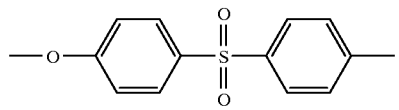

Polymers of this kind are widely available on the market.

The pores contained in the individual layers are, without exception, permeable pores, i.e., pores with varying amounts of connections from one to another, i.e., openings from one pore to another pore.

The degree of permeability is particularly high in layer B with sponge-like shaped pores. This sponge-like structure has a structure equivalent to that which is also illustrated in FIG. 4 of publication EP-B1-0 361 085.

It was particularly surprising to find that membranes with specially designed characteristics for different applications can be produced from differing types of polymers using the method of the invention. It is possible with the present invention to cover a very wide cut-off range and to set precisely defined cut-offs within this range without it being necessary to alter the composition of the spinning solution.

On the other hand, it is possible to set the hydraulic permeability within a wide range by varying the layer C, without it being necessary to alter the cut-off.

If an appropriate choice of polymer is made, in particular where polyether sulfones are used, the membranes can be effectively steam sterilized. The membranes also have a high biocompatibility, chemical stability, oxidation resistance and UV-resistance.

Dialysis membranes produced in accordance with the invention are characterized by a very high $\beta_2$ microglobulin removal rate when used for haemodialysis.

Also particularly advantageous is the reusability of the membranes of the invention, i.e., they can be cleaned and dried after use, and used again without any detriment to their performance. They have good mechanical properties, such as strength and a high ultimate elongation when dry. The membranes can be stored and transported in a dry condition.

However, it is also possible, for example, to load the membrane with glycerine after washing, and in this way influence its properties, such as its self-sealing properties when it is embedded in embedding masses such as polyurethane or epoxy resins. Its separating properties can also be influenced.

The invention is clarified further in the following examples:

EXAMPLES 1–5

The following components are used to produce a slurry (paste-type mixture) by stirring at room temperature:

| | | |
|---|---|---|
| Polyether sulfone (BASF; Ultrason 6020) | 22.5 | weight % |
| Polyvinylpyrrolidone (ISP; PVP K30) | 11.3 | weight % |
| ε-caprolactam | 30.8 | weight % |
| γ-butyrolactone | 30.8 | weight % |
| Glycerine | 4.6 | weight % |

The slurry is then heated to 115° C. while it is stirred vigorously, in order to form a homogenous solution. The solution is then cooled to approximately 50° C., outgassed by applying a vacuum and filtered.

Using a standard hollow-fiber nozzle and a 60 cm-long air gap (environmentally-sealed air conditioned channel), in which a temperature of 35° C. and a relative humidity of 85% are maintained, hollow fibers are produced using the inner fillings shown in the following table. Demineralized water is used for the precipitating bath at a temperature of 40° C. The membranes are washed with hot water of 80° C. and then dried at room temperature.

The test results entered in the table are illustrated in the form of a graph in FIG. 1.

TABLE 1

| | Composition of inner filling | | | Precip. bath | Nozzle | UFR | |
| | Caprolactam | Glycerine | Demin. water | temp. | temp. | [ml/(m²h | |
| No. | [weight %] | [weight %] | [weight %] | [°C.] | [°C.] | mmHg)] | SC (CC) |
|---|---|---|---|---|---|---|---|
| 1 | 43.0 | 43.0 | 14.0 | 40 | 60 | 60 | 0.25 |
| 2 | 44.0 | 44.0 | 12.0 | 40 | 60 | 70 | 0.30 |
| 3 | 45.0 | 45.0 | 10.0 | 40 | 60 | 92 | 0.37 |
| 4 | 46.0 | 46.0 | 8.0 | 45 | 60 | 234 | 0.58 |
| 5 | 47.0 | 47.0 | 6.0 | 40 | 60 | 420 | 0.73 |

EXAMPLES 6 to 12

Using the same method as in examples 1–5, a spinning solution is produced from the following components:

| | | |
|---|---|---|
| Polyether sulfone (BASF; Ultrason 6020) | 20.0 | weight % |
| Polyvinylpyrrolidone (ISP; PVP K30) | 14.4 | weight % |
| ε-caprolactam | 30.3 | weight % |
| γ-butyrolactone | 30.3 | weight % |
| Glycerine | 4.5 | weight % |
| Demineralised water | 0.5 | weight % |

The inner fillings used and the test results are summarised in Table 2 and illustrated in graph form in FIG. 1.

TABLE 2

| No. | Composition of inner filling | | | Precip. bath temp. [°C.] | Nozzle temp. [°C.] | UFR [ml/(m²h mmHg)] | SC (CC) |
|---|---|---|---|---|---|---|---|
| | Caprolactam [weight %] | Glycerine [weight %] | Demin. water [weight %] | | | | |
| 6  | 45.0  | 45.0  | 10.0 | 50 | 57 | 120 | 0.29 |
| 7  | 45.75 | 45.75 | 8.5  | 47 | 62 | 260 | 0.44 |
| 8  | 45.5  | 45.5  | 9.0  | 55 | 65 | 517 | 0.64 |
| 9  | 45.5  | 45.5  | 9.0  | 55 | 68 | 570 | 0.67 |
| 10 | 45.5  | 45.5  | 9.0  | 55 | 71 | 703 | 0.72 |
| 11 | 45.5  | 45.5  | 9.0  | 55 | 74 | 810 | 0.77 |
| 12 | 45.5  | 45.5  | 9.0  | 55 | 77 | 885 | 0.80 |

The graph curves show that the method of the invention can be used to produce membranes with specific hydraulic permeabilities and differing sieving coefficients (cut-offs). It is, of course, possible to increase the number of curves shown in FIG. 1 with just a few tests, and in this way determine recipes experimentally for membranes for a wide range of applications.

EXAMPLE 13

Using the same method as in the preceding examples, the following components are used to produce a spinning solution (viscosity at 40° C.=150 Pa.s) and hollow fibers:

| | | |
|---|---|---|
| Polyether sulfone (Ultrason 6020 BASF) | 20.0 | weight % |
| Polyvinylpyrrolidone (PVP) K30 | 14.0 | weight % |
| Caprolactam | 30.3 | weight % |
| Butyrolactone | 30.3 | weight % |
| Glycerine | 4.7 | weight % |
| Water | 0.7 | weight % | whereby a mixture of 46 weight percent caprolactam, 46% glycerine and 8% demineralized water is used as the inner filling. The length of the air gap was 65 cm. The air gap was set to a relative humidity of approx. 85% and a temperature of 38° C. Demineralised water at a temperature of 56° C. was used for the precipitation bath. The nozzle temperature was 67° C.

The membrane produced in this way is excellently suited for use as a so-called high-flux dialysis membrane.

The dialysis membrane has the following values:

Sieve coefficient of cytochrome C: 0.75

Sieve coefficient of albumin: 0.05

Cut-off for dextran (retention>95%): 55,000 Daltons

UFR (albumin): 50 ml/(hm²mmHG)

UFR (water): 600 ml/(hm²mmHG)

The test methods listed later in the text were used to determine the membrane parameters given above.

EXAMPLES 14–17

Using the same method as in the examples above, a spinning solution is produced from the following components:

| | | |
|---|---|---|
| Polyether sulfone (Ultrason 6020 BASF) | 17.8 | weight % |
| Sulphonated polyether sulfone (sulphonation degree 7%) | 1.3 | weight % |
| Polyvinylpyrrolidone K 30 | 19.1 | weight % |
| Caprolactam | 14.3 | weight % |
| Butyrolactone | 43.0 | weight % |
| Glycerine | 3.9 | weight % |
| Water | 0.6 | weight % |

The solution was formed into hollow fibers, using a spinning nozzle with annular gap for the polymer solution and a needle for the lumen filling. The precipitation bath was demineralized water. The air gap was 60 cm high. The temperature of the spinning solution was 30° C. and the temperature of the inner filling 25° C.

The compositions of the inner fillings are listed in Table 3.

TABLE 3

| No. | ε-Caprolactam weight % | Glycerine weight % | Water weight % | Permeability ml/h · m² · mmHg |
|---|---|---|---|---|
| 14 | 43    | 4.3   | 14   | 460  |
| 15 | 44.75 | 44.75 | 10.5 | 1500 |
| 16 | 45.25 | 45.25 | 9.5  | 3850 |
| 17 | 45.75 | 45.75 | 8.5  | 5600 |

The retention capability for dextran molecules by the membranes produced as described in examples 14–17 is shown in graph form in FIG. 2.

The membranes can be characterized using the following methods:

Ultrafiltration rate for water (hydraulic permeability)

The hydraulic permeability is determined using capillary modules, each of which contains 100 capillaries with a free filament length of 20 cm. Polyurethane is used to embed the capillaries. When selecting the polyurethane, it is important to ensure that the bonding mass does not enter and close the lumen of the capillaries. The capillaries are embedded by about 1 cm. In dead-end mode, distilled water is filtered through the membrane to be tested, whereby a medium trans-membrane pressure (TMP) of 0.2 bar is set.

The amount of water filtered per unit of time is measured at the specified transmembrane pressure.

$$TMP = \{P(\text{Inlet}) + P(\text{Outlet})\}/2$$

where P(Inlet) the pressure difference across the membrane at the inlet of the sample P(Outlet)=the pressure difference across the membrane at the outlet of the sample.

$$UFR = \frac{V_{Filtrate}}{t \cdot TMP \cdot A}$$

| | |
|---|---|
| $V_{filtrate}$ | Filtrate volume [ml] collected in the interval of time $t$ |
| $t$ | Period of time during which the filtrate is collected [h] |
| $A$: | Inner surface of the membrane |

$$TMP = \frac{\text{Inlet pressure} + \text{Outlet pressure}}{2}$$

Sieving coefficient for cytochrome C and bovine albumin from an aqueous 5% bovine albumin solution The sieve coefficients for Cytochrome C and bovine albumin were determined in line with DIN 58 353. The fluxes for the filtrate $Q_F$ and test liquid at the inlet of the sample $Q_{in}$ were set as follows:

$Q_{in}$=200 ml/ (min.m$^2$)

$Q_F$=10 ml/ (min.m$^2$)

The test solution used is a 5% aqueous bovine albumin solution (Boehringer) to which a DAB 10 buffer is added:
Composition of the buffer:

| | |
|---|---|
| KH$_2$PO$_4$ | 0.19 g/l |
| NaCl | 8.0 g/l |
| Na$_2$HPO$_4$ · 12H$_2$O | 2.38 g/l |

Characterization of the cut-off by determining the retention capability for dextran molecules of varying molecular weights A cross-flow of polydisperse aqueous dextran solution (pool) is applied to the membrane which is to be characterized. A defined filtrate flux density through the membrane is set. The proportions of dextran molecules of differing molecular weights MW in the filtrate flow or the pool is determined using gel permeation chromatography.

For this purpose, the HPLC spectrum of the pool or the filtrate respectively are divided into 40 equidistant sections, the area of which is determined by numerical integration. A molecular weight corresponding to the gauge spectrum, which is determined using monodisperse dextran molecules with a known molecular weight, is allocated to each of these intervals of time. The sieving coefficient of the membrane for dextran molecules with a molecular weight MW is obtained by calculating the ratio between the area segments for this molecular weight in the HPLC spectra of the filtrate and of the pool.

$$SC_{MW} = \frac{\text{Area (MW, permeate)}}{\text{Area (MW, parent solution)}}$$

Retention=(1−$SC$).100 [%]

The retention coefficient for dextran molecules of a molecular weight MW can be calculated as follows:

Retention coefficient$_{(MW)}$=1−$SC_{(MW)}$

Because the retention profile determined is very sensitive to the test conditions (concentration polarization), the filtrate flux density and the wall shear rate must be clearly defined in determination of the retention profile. For a capillary membrane module with a length 1, which contains n capillary membranes, the filtrate flux density and axial volume flow are calculated as follows:

$$QL = \frac{n \cdot d^3 \cdot Yw}{1.64 \cdot 10^{11}}$$

Yw: Wall shear rate=2000/sec.
d: Inside diameter of the capillary membranes [$\mu$m]
n: Number of capillary membranes in sample
QL: axial volume flow in the lumen of the capillary membranes [ml/min.]

$QF$=$n.n.d.1.VL.10^{-9}$

QF: Filtrate flow [ml/min.]
1: free length of the membrane in the sample
VL: Speed in the lumen [cm/min.]

$VL=QL.4.10^8/(n.nh.d^2)$ n: Number of capillaries in the sample
Composition of the dextran solution used

| Dextran type: | T10 | T40 | T70 | T500 |
|---|---|---|---|---|
| Initial weight: | 0.64 g/l | 0.90 g/l | 0.4 g/l | 0.66 g/l |

Manufacturer: Pharmacia Biotech; Article name: T10, T40, T70, T500)

The solutions are prepared with demineralized water.

EXAMPLE 18

Capillary membranes with a lumen of 200 $\mu$m and a membrane wall thickness of 40 $\mu$m were produced by the method described using a 19% spinning solution with a viscosity of approx. 40 Pa.s at 40° C. and consisting of:

19.0 weight % polyether sulfone type E 3010 (BASF)
13.3 weight % polyvinylpyrrolidone type K 30 (ISP)
31.5 weight % caprolactam
31.5 weight % butyrolactone
4.7 weight % glycerine (water-free).

A mixture of 42.5/42.5/15 parts caprolactam/glycerine/water was used for formation of the lumen. After passage through an environmentally-sealed air conditioned channel with a length of 60 cm, the shaped capillary membrane was stabilized in a water bath adjusted to a temperature of 50° C., finally washed in water at a temperature of 80° C. and dried in hot air.

FIG. 3 is a diagrammatic illustration of the pore distribution in a membrane of the invention.

Within the scope of the invention, the membrane dimensions, i.e., the wall thickness and the inside diameter can be varied within relatively wide ranges; it is also possible to adapt the membrane for various different applications in this way. The wall thickness is generally between 10 and 50 $\mu$m and the lumen between 150 and 250 $\mu$m for haemodialysis, haemodiafiltration and haemofiltration. Preferred values are, for example, a wall thickness of 30 $\mu$m and a lumen of 200 $\mu$m.

For other applications, e.g., ultrafiltration, the wall thickness can measure up to 1000 $\mu$m and the lumen up to 5000 $\mu$m. These figures are intended only as a guideline; it is, of course, also possible to increase and decrease the dimensions.

What is claimed is:

1. Integral, multi-asymmetric, semi-permeable membranes made from $\epsilon$-caprolactam-soluble polymers in the form of flat membranes, tubular membranes or hollow fiber membranes, comprising
   a) a thin separating layer A on one surface of the membrane, with a defined cut-off within a range of between 500 and 5,000,000 Daltons, wherein the separating layer A accounts for a maximum of 20% of the entire thickness of the membrane wall and has open pores,
   b) a large-pored, sponge-like, support layer B which is adjacent to the separating layer A, with cellular pores but without finger pores, the support layer B having a pore gradient starting from the border with the separating layer A, wherein at least 50% of the pores in the support layer B have a diameter of between 0.1 and 1 $\mu$m, and having a hydraulic resistance that is lower than separating layer A and layer C, and
   c) a layer C which is adjacent to support layer B, wherein at least 50% of the pores in layer C have a pore diameter of between 0.05 and 2 $\mu$m, with a pore size of layer C which is larger than the pore size of separating layer A but smaller than the pore size of support layer B, and which in combination with the separating layer A determines the hydraulic permeability of the membrane, without affecting the cut-off, and which is open-pored on a second surface of the membrane, wherein the open pores are larger than the open pores on the surface of the membrane formed by separating layer A.

2. A membrane in accordance with claim 1, wherein the separating layer A accounts for a maximum of between 5 and 10% of the entire thickness of the membrane wall.

3. A membrane in accordance with claim 1, wherein the separating layer A accounts for a maximum of between 1 and 5% of the entire thickness of the membrane wall.

4. A membrane in accordance with claim 1, wherein the defined cut-off is within a range of between 500 and 400,000 Daltons.

5. A membrane in accordance with claim 4, wherein the defined cut-off is within a range of between 500 and 60,000 Daltons.

6. A membrane in accordance with claim 1, wherein the support layer B accounts for between 10 and 60% and layer C accounts for between 30 and 80% of the entire thickness of the membrane.

7. A membrane in accordance with claim 1, wherein the membrane consists of at least 80 weight percent polyether sulfone.

8. A process for manufacturing membranes in accordance with claim 1, comprising preparing a highly viscous polymer solution containing 17 to 27 weight percent of a polymer which is soluble in $\epsilon$-caprolactam in a mixture of $\epsilon$-caprolactam and one or more co-solvents and optionally nonsolvents and further additives, wherein the solution has a viscosity of at least 20 Pa.s when measured at 40° C., shaping the polymer solution into a flat, tubular or hollow-fiber membrane, wherein during the shaping of the polymer solution a viscosity profile throughout the thickness of the forming membrane is set by applying different temperatures on each surface of the shaped polymer solution, precipitating the polymer by diffusively induced coagulation, during which process the separating layer A is formed by faster coagulation on the side with the lower temperature than on the side on which layer C is formed.

9. A process in accordance with claim 8, wherein the polymer solution has a temperature of between 20 and 90° C. during the shaping process.

10. A process in accordance with claim 9, wherein the polymer solution has a temperature of between 40 and 90° C. and a viscosity of between 150 and 5 Pa.s during the shaping process.

11. A process in accordance with claim 8, wherein the polymer solution has a viscosity of between 40 and 200 Pa.s when measured at 40° C.

12. A process in accordance with claim 11, wherein the polymer solution has a viscosity of between 50 and 150 Pa.s.

13. A process in accordance with claim 8, wherein the polymer solution is shaped into a hollow fiber membrane and coagulation is induced inside the hollow fiber membrane with an inner filling having a viscosity of between 0.03 and 0.5 Pa.s when measured at 25° C., the hollow fiber is guided through an air gap which is conditioned with water vapor, and the hollow fiber is then guided through a precipitation bath for completion of the coagulation process and fixing of the structure.

14. A process in accordance with claim 13, wherein the precipitation bath is a temperature-controlled water bath.

15. A process in accordance with claim 8, wherein the diffusively induced coagulation includes an in-process conditioned air space containing a nonsolvent of the polymer in gas or vapor form.

16. Separating process in a nanofiltration or lower ultrafiltration range, comprising contacting a feed with the membrane of claim 1.

17. A process of haemodialysis, haemodiafiltration or haemofiltration, comprising contacting blood with the membrane of claim 1.

18. A membrane in accordance with claim 1, further comprising active agents encapsulated in the membrane.

19. A process for controlling release of active agents in extracoporeal and intracorporeal treatment of human or animal body, comprising controlling the release of the active agents encapsulated in the membrane from the membrane of claim 18.

* * * * *